(12) United States Patent
Kinnerk et al.

(10) Patent No.: US 10,969,821 B2
(45) Date of Patent: Apr. 6, 2021

(54) LATENCY SYNCHRONIZATION ACROSS CLOCK DOMAINS

(71) Applicant: Xilinx, Inc., San Jose, CA (US)

(72) Inventors: Ryan Kinnerk, Crosshaven (IE); Bob W. Verbruggen, Saggart (IE); John E. McGrath, Cahir (IE)

(73) Assignee: XILINX, INC., San Jose, CA (US)

(*) Notice: Subject to any disclaimer, the term of this patent is extended or adjusted under 35 U.S.C. 154(b) by 253 days.

(21) Appl. No.: 15/991,179

(22) Filed: May 29, 2018

(65) Prior Publication Data
US 2020/0097038 A1    Mar. 26, 2020

(51) Int. Cl.
*G06F 1/12*    (2006.01)
*G06F 1/14*    (2006.01)
*G06F 1/10*    (2006.01)

(52) U.S. Cl.
CPC ............ *G06F 1/12* (2013.01); *G06F 1/10* (2013.01); *G06F 1/14* (2013.01); *G06F 2213/0038* (2013.01)

(58) Field of Classification Search
CPC ........................................................ G06F 1/12
See application file for complete search history.

(56) References Cited

U.S. PATENT DOCUMENTS

| | | | | |
|---|---|---|---|---|
| 8,386,828 B1* | 2/2013 | Ambatipudi | ......... | H03K 21/023 326/96 |
| 2006/0225014 A1* | 10/2006 | Hosono | ............... | G06F 30/3312 716/113 |
| 2015/0205579 A1* | 7/2015 | Mendel | ..................... | G06F 5/14 710/57 |

OTHER PUBLICATIONS

Texas Instruments, "LMX2594 15-GHz Wideband PLLatinum RF Synthesizer with Phase Synchronization and JESD204B Support," LMX2594, Mar. 2017, pp. 1-73, Texas Instruments, Dallas, Texas, USA.
Texas Instruments, "JESD204B Overview," Jul. 26, 2016, pp. 1-32, Texas Instruments, Dallas, Texas, USA.
Texas Instruments, "JESD204B Deterministic Latency," Jul. 26, 2016, pp. 1-50, Texas Instruments, Dallas, Texas, USA.
Analog Devices, "Dual, 16-Bit, 12.6 GSPS RF DAC with Channelizers," AD9172, Jun. 1, 2017, pp. 1-145, Analog Devices, Norwood, Massachusetts, USA.

* cited by examiner

*Primary Examiner* — Paul Yen
*Assistant Examiner* — Joshua Neveln
(74) *Attorney, Agent, or Firm* — Patterson + Sheridan, LLP

(57) ABSTRACT

Methods and apparatus for tracking delay in signals sent from a first clock domain to a second clock domain are disclosed. For example, at a first time a common timing reference signal (SysRef) may be received at the first clock domain, and a latency marker may be input into a first-in first-out data structure (FIFO) coupling the first clock domain to the second clock domain. At a second time, the SysRef may be received at the second clock domain, and a timer may be started at the second clock domain. At a third time, the latency marker may be received from the FIFO at the second clock domain, and the counter may be stopped at a final count. A FIFO latency may be determined based on the final count and on a difference between the second time and the first time.

20 Claims, 14 Drawing Sheets

LATENCY SYNCHRONIZATION ACROSS CLOCK DOMAINS

GOVERNMENT RIGHTS

This invention was made, in part, with Government support under Agreement No. HR0011-16-3-0004, awarded by Defense Advanced Research Projects Agency. The Government has certain rights in the invention.

TECHNICAL FIELD

Aspects of the present disclosure generally relate to integrated circuits, and specifically to latency in systems including multiple clock domains.

BACKGROUND

Circuits incorporating multiple data converters, such as analog to digital converters (ADCs) and/or digital to analog converters (ADCs), etc., may require precise synchronization of data streams, as well as synchronous control of related data-path control. Such synchronization may be necessary to ensure data stream processing is deterministically applied. However, such circuits may include a number of independent clock domains. Data transfers between such clock domains may complicate timing synchronization. It may be desirable to ensure synchronization for data streams crossing such independent clock domains, as well as reducing latency.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to tracking delay in signals sent from a first clock domain to a second clock domain. In one example, a method is disclosed. The method may include, at a first time, receiving a common timing reference signal (SysRef) at the first clock domain, and inputting a latency marker into a first-in first-out data structure (FIFO) coupling the first clock domain to the second clock domain, at a second time, receiving the SysRef at the second clock domain and starting a counter at the second clock domain, at a third time, receiving the latency marker from the FIFO at the second clock domain, and stopping the counter at a final count, and determining a FIFO latency based on the final count and on a difference between the second time and the first time.

In another example, a latency determination circuit is disclosed. The latency determination circuit may include a transmitter on a first clock domain, a receiver on a second clock domain, the receiver including a counter, and a first-in first-out data structure (FIFO) coupling the first clock domain to the second clock domain. The transmitter may be configured to, at a first time, receive a common timing reference signal (SysRef) and input a latency marker into the FIFO. The receiver may be configured to, at a second time, receive the SysRef, and start the counter. The receiver may further be configured to, at a third time, receive the latency marker from the FIFO, and stop the counter at a final count. The receiver may then determine a FIFO latency based on the final count and on a difference between the second time and the first time.

In another example, a latency determination circuit is disclosed. The latency determination circuit may include one or more processors, and a memory. The memory may contain instructions that, when executed by the one or more processors, cause the latency determination circuit to perform operations comprising, at a first time, receiving a common timing reference signal (SysRef) at the first clock domain, and inputting a latency marker into a first-in first-out data structure (FIFO) coupling the first clock domain to the second clock domain, at a second time, receiving the SysRef at the second clock domain and starting a counter at the second clock domain, at a third time, receiving the latency marker from the FIFO at the second clock domain, and stopping the counter at a final count, and determining a FIFO latency based on the final count and on a difference between the second time and the first time.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

As described above, precise synchronization of data streams may be important in circuits incorporating multiple data converters, such as ADCs and DACs, where data streams cross from one clock domain to another clock domain. Such crossings may be called clock domain crossings, or CDCs. Such synchronization may be provided using one or more first-in first-out data structures (FIFO's) or elastic buffers. However, use of such circuit elements may introduce latency uncertainty. For example, FIFO's or elastic buffers may exhibit different latencies. The JESD204B standard was developed as one means for addressing this problem. One aspect of the JESD204B standard is the inclusion of a common timing reference signal, referred to as SysRef. SysRef may be a periodic signal provided to each clock domain and may allow for transfer of data from a transmitter (TX) on one clock domain, to a receiver (RX) on a different clock domain such that the transfer has deterministic latency.

Figure 1:
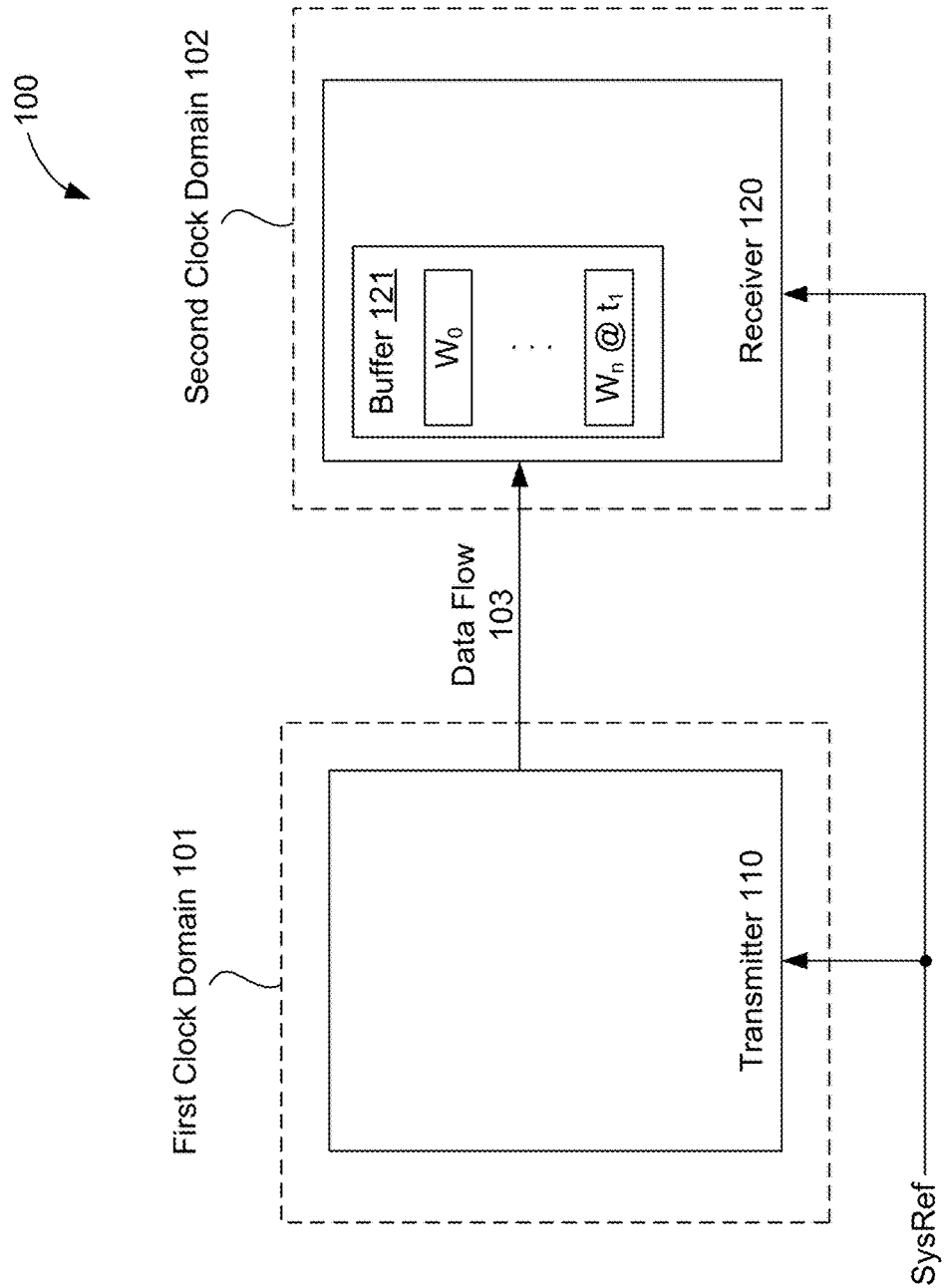
FIG. 1 shows an example data flow from a first clock domain to a second clock domain, in which some aspects of the present disclosure may be implemented.

A number of approaches may typically be used for providing this deterministic latency. For example, FIG. 1 shows a system 100 for ensuring deterministic latency in a data transfer from a first clock domain 101 to a second clock domain 102. More particularly, system 100 may include a transmitter (TX) 110 in the first clock domain 101, which may transmit data in a data flow 103 to a receiver (RX) in the second clock domain 102. Each of the TX and the RX may receive the common timing reference signal SysRef. At the TX 110, a predetermined data word may be associated with SysRef. For example, let this data word be denoted $W_0$, a data word which is written by the TX 110 at time $t_0$. At the RX 120, data words may be discarded until the predetermined data word $W_0$ is received. Then, an elastic buffer 121 of RX 120 may be filled, such that $W_0$ is the first data word added to the elastic buffer 121. The RX 120 may then begin to read from elastic buffer 121 at a time $t_1$ which is associated with SysRef. For example, $t_1$ may be a fractional or integer number of periods of the SysRef signal. Because $W_0$ is written at TX 110 at a time $t_0$ which is associated with SysRef, and $W_0$ is subsequently read at RX 120 at another time $t_1$ which is also associated with SysRef, the total system latency may be predictable. However, this approach may have several disadvantages. For example, the elastic buffer 121 must be capable of containing all TX data between the arrival of $W_0$ at RX 120 and $t_1$. Because $t_1$ must be chosen to be after the latest possible arrival of $W_0$ at RX 120, such an elastic buffer may be large, and may thus add significant power and area to a system. Further, because in this approach the overall system latency is $(t_1-t_0)$, this approach directly adds to the system latency. Such added power/area and added latency may be unacceptable.

Figure 2:
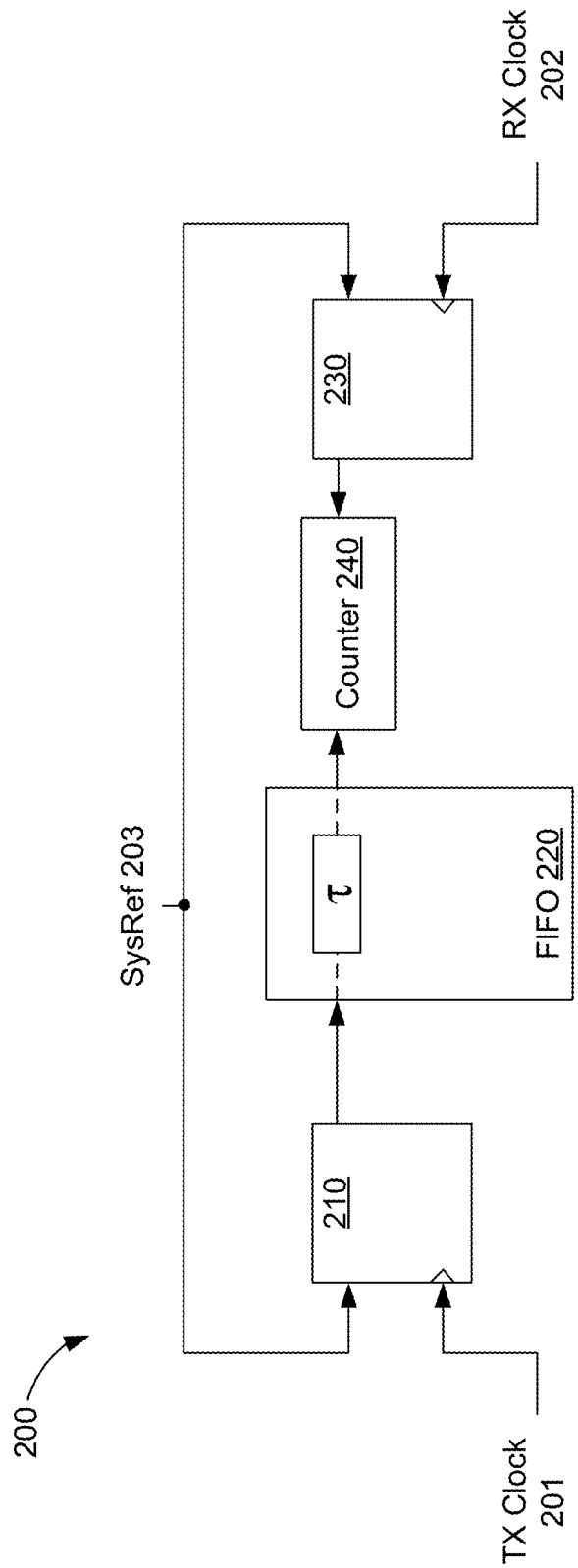
FIG. 2 shows an example system 200 which may track delay in signals sent from the first clock domain to the second clock domain, in accordance with some implementations.

Accordingly, the example embodiments provide for determination of latency in a FIFO or buffer coupling a first clock domain to a second clock domain. More particularly, the example embodiments may determine a latency for a FIFO coupling a first clock domain to a second clock domain by using an injected latency marker. FIG. 2 shows an example system 200 which may track delay in signals sent from the first clock domain to the second clock domain, in accordance with some implementations. Note that the system 200 may be coupled between a first clock domain and a second clock domain. A data transmitter may be in the first clock domain, and may transmit data to a receiver in the second clock domain. The transmitter, receiver, and data flow are not depicted in FIG. 2 for simplicity, to focus on latency determination. With respect to FIG. 2, a TX clock 201 may be a clock for the data transmitter on the first clock domain, while an RX clock 202 may be a clock for the receiver on the second clock domain. Each of the first and second clock domains may receive the SysRef 203. At a first time, $t_1$, SysRef is received at the TX. For example, a signal may be generated at the time $t_1$ using a TX flip-flop 210, which may be clocked by the TX clock 201. At the time $t_1$, a latency marker may be injected into the FIFO 220. For example, the latency marker may be a predetermined signal, such as a predetermined data word. Further, in the second clock domain, the SysRef may be received at a second time $t_2$. For example, a signal may be generated at the second time $t_2$ using an RX flip-flop 230, which may be clocked by the RX clock 202. At the second time, $t_2$, a count may be started at the counter 240. The FIFO 220 may be characterized by a delay $\tau$, which may represent a latency associated with the FIFO 220. At a third time $t_3$, the latency marker may be read from FIFO 220. At this third time $t_3$, the count may be stopped at counter 240. This count at counter 240 may then reflect a measure of the elapsed time between the second time and the third time. The latency $\tau$ of the FIFO may then be determined based on the final count value of the counter, and the first and second times. In other words:

$$t_{count}=t_3-t_2=t_1+\tau-t_2$$

$$\therefore \tau=t_{count}+(t_2-t_1)$$

where $t_{count}$ is the final count value of the counter 240. When this latency is measured, it may be compensated for, either by adding an appropriate number of cycles of delay, for example using a delay buffer or other suitable delay circuit. Alternatively, as further discussed below, the delay may be compensated for by adjusting one or more read pointer locations in the FIFO itself.

The example implementations may determine the FIFO latency for each FIFO coupling the first clock domain to another clock domain. For example, multiple data converters may each be coupled to one receiver, such as a field-programmable gate array (FPGA), an application-specific integrated circuit (ASIC), and so on. Such data converters are commonly used in applications relating to multiple input multiple output (MIMO) communications, beamforming, phased-array radar, and so on. Because each FIFO coupling the receiver to a respective data converter may have a different FIFO latency, the example implementations allow for each FIFO latency to be independently determined. Further, because the example implementations require significantly less buffering of data as compared to the method described in FIG. 1, and may therefore benefit from a corresponding reduction in latency, power and area.

Note that determining the FIFO latency may be somewhat more complicated when the FIFO is configured to use multiple read and write words per clock cycle. Accordingly, in some example implementations this may be compensated for by ensuring that the latency marker is configured to mark only a single predetermined word. For example, for a FIFO written to at Nw words per write clock, and read from at Nr words per read clock, a latency marker may mark a predetermined one of the Nw words, such as a first word $W_0$. This marked word may still be injected into the FIFO at the first time, as discussed above. However, while the marked word will still be synchronous to the read clock some number of cycles later, the third time is not sufficient for measuring the latency through such a multi-word FIFO. Accordingly, in some implementations a modified counter value may be determined for measuring the latency. More particularly, a modified counter value may be given as $N_r*t_{count}$+MarkedWordIndex, where MarkedWordIndex is the index of the marked word injected into the FIFO at the first time at the read side of the FIFO.

In addition to aligning data, other aspects of data path control are typically required to be synchronized among data converters. For example, a numerically controlled oscillator (NCO) reset moment may be synchronized. For systems employing the JESD204B standard, or another scheme using an external common timing reference signal, such synchronization may be achieved by issuing an event in the data path using SysRef. However, using SysRef to issue such a one-time event signal may allow additional errors to result. For example, inconsistent latency may be introduced from SysRef drift post-alignment. Further issues may occur in connection with cleanly generating and capturing such a one-shot event signal (for example due to signal integrity or other issues with receiving and capturing the event signal).

Instead of using SysRef to issue such an event, in some example implementations the FIFO may be configured to pass a synchronous event with the data. For example, the above-described latency marker used for determining the FIFO latency may be an example of such as synchronous event which may be passed with the data. Passing such a synchronous event with the data may allow for synchronization operations which align the data to also ensure that the latency of the event matches the latency of the aligned data. Passing this synchronous event with the data may allow for the event to propagate with deterministic and data-aligned latency. Further, passing the event signal with the data may avoid the above-described issues with SysRef drift, and with event generation and capture which may result when SysRef is used for issuing the event.

As discussed above, some example data converters may include DACs and ADCs. For example implementations for use with DACs, a synchronous event may be passed with the data by widening the data bus by one bit to incorporate a bit for the event marker. When the data and the event are read out of the FIFO, they may optionally be synchronously delayed by a number of read clock periods to allow the event to be delayed for later application. For example, such a delay may be used for synchronizing the application of the event across multiple data converters, accounting for the measured latency.

For ADCs, passing the event is more complicated, because the event must pass counter to the direction of the data. For example implementations incorporating ADCs, one or more FIFO pointers of the ADC may be used to set up a counter-flow transfer. Using such a FIFO pointer for setting up the counter-flow transfer may allow the event to propagate with predictable latency. For example, the latency of the event propagating into the ADC may match the FIFO depth minus the latency of the streaming data.

As discussed above, while in some implementations, compensating for the determined FIFO latency may include adding an appropriate number of cycles of delay external to the FIFO. In some other implementations, the FIFO latency may be compensated for by adjusting one or more read pointer locations in the FIFO itself. Such implementations may allow for the determined latency to be compensated for without the use of additional circuitry such as delay buffers. Adjusting the read pointer of the FIFO may also allow for each FIFO's latency to be compensated for individually, which may compensate for the variation in latency among each FIFO in a system. For example, a receiver may be coupled to each of a plurality of data converters via a plurality of FIFOs. Acting on the read pointer of each of these FIFOs may allow for variation in FIFO latencies to be individually compensated for at each FIFO.

Figures 3A, 3B:
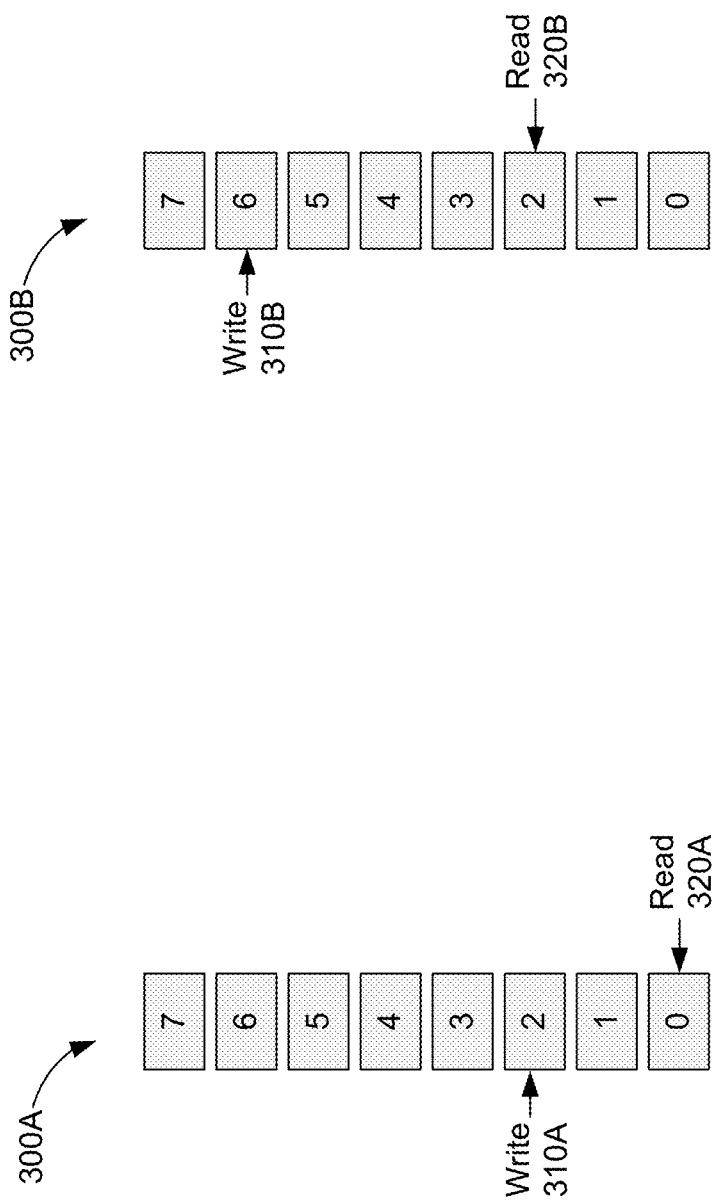
FIGS. 3A-3D show portions of a first-in first-out data structure (FIFO), in which a read pointer may be positively or negatively offset to compensate for FIFO latency mismatches, in accordance with some implementations.

One source of variation in latency among FIFOs relates to how FIFO pointers are released from a reset condition. FIG. 3A shows a portion 300A of a FIFO, in which a read pointer may be adjusted to compensate for FIFO latency mismatch, in accordance with some implementations. Note that while FIFO portion 300A includes only 8 data positions, labelled 0-7, that the example implementations may be used with FIFOs having any number of data positions. With respect to FIG. 3A, a write pointer 310A may point to a data location where data is next to be written to the FIFO, for example by TX 110 of FIG. 1. A read pointer 320A may point to a data location where data is next to be read from the FIFO, for example by RX 120 of FIG. 1. Note that FIG. 3A shows the FIFO portion 300A shortly after a FIFO reset. At FIFO reset, the write pointer 310A and the read pointer 320A may each be at position 0 of the FIFO. The write pointer 310 may first be released from reset synchronous with the clock domain from which data is written to the FIFO—for example, TX clock 201 of FIG. 2. FIG. 3A shows the FIFO portion 300A shortly after the write pointer has been released, but before the read pointer 320A has been released from reset.

Subsequently, a signal may be transmitted from the write pointer's clock domain to the read pointer's clock domain to release the read pointer from reset. This signal transmission may be performed using a data resynchronizer, as the two clock domains are asynchronous. Variation in the number of read domain clock cycles required for this release may lead to FIFO latency variation among different FIFOs. FIG. 3B shows a portion 300B of a FIFO, in accordance with some implementations. With respect to FIG. 3B, not only has the write pointer 310B been released from reset, but also the read pointer 320B has been released.

Figure 3D:
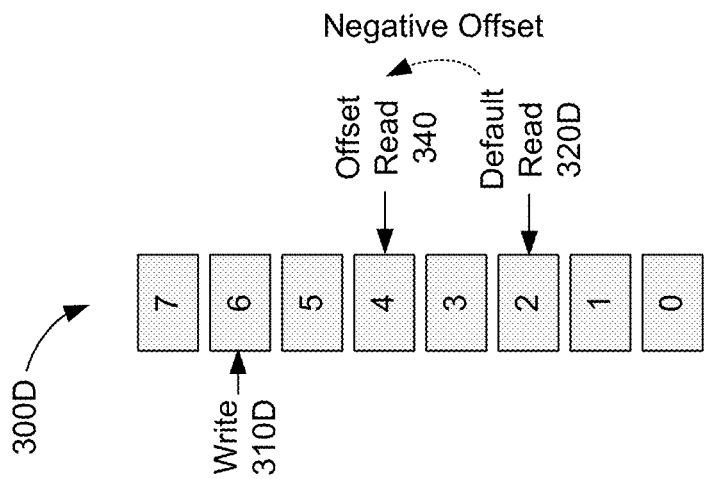
Figure 3C:
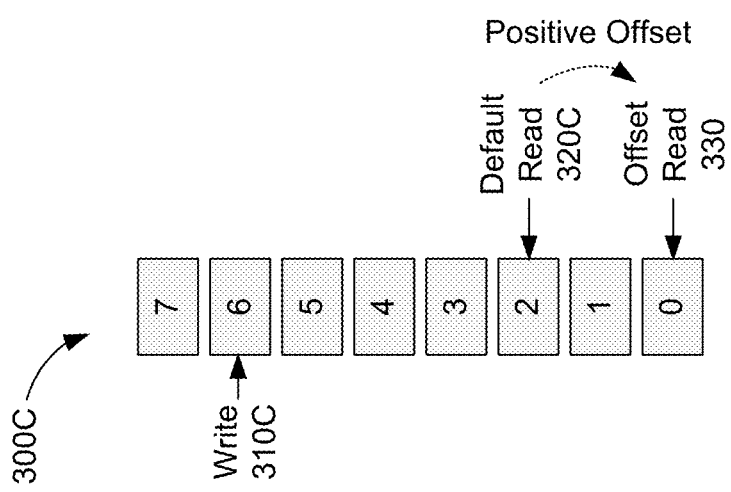

As discussed above, the example implementations may determine FIFO latency by passing a latency marker through the FIFO, for example as discussed above with respect to FIG. 2. After determining this FIFO latency, in some implementations, the read pointer may be either positively or negatively offset, in order to compensate for a determined difference in FIFO latency. A positively offset read pointer may be a read pointer whose distance from the write pointer has been increased with the positive offset. In other words, such a positive offset corresponds to an added delay, and may be used instead of adding external delay to the circuit. FIG. 3C shows a portion 300C of a FIFO, in which the read pointer has been positively offset, in accordance with some implementations. As shown with respect to FIG. 3C, while the write pointer 310C is unchanged as compared with the position of write pointer 310B, the read pointer, rather than being located at default read position 320C, has been positively offset from the write pointer 310C, and is located at offset read position 330. Such a positive offset may be used to ensure each of a plurality of data converters are synchronized. For example, if three data converters are each coupled to a receiver, and a first of the data converters has a FIFO latency one read clock cycle less than the other two, a positive offset may be added to the first data converter's FIFO to ensure each data converter has the same latency.

While positive read pointer offsets may be used to compensate for differences in FIFO latency, they add additional delay to a circuit, which may be undesirable. Rather than positively offsetting a read pointer, some other implementations may negatively offset a read pointer in order to compensate for FIFO latency mismatch. For example, FIG. 3D shows a portion 300D of a FIFO, in which the read pointer has been negatively offset, in accordance with some implementations. With respect to FIG. 3D, while the write pointer 310D is unchanged as compared with the position of write pointer 310B, the read pointer, rather than being located at default read pointer position 320D, has been negatively offset from the write pointer 310D and is located at offset read pointer location 340. Such a negative offset may be used to ensure each of a plurality of data converters are synchronized without adding delay to the circuit. For example, if three data converters are each coupled to a receiver, and a first of the data converters has a FIFO latency of one read clock cycle less than the second and third of the data converters, rather that positively offsetting first data converter's FIFO, the second and third data converters may negatively offset their FIFO read pointer positions to match the lower-latency first data converter. Thus, each of the three data converters may be synchronized without introducing additional latency to the circuit. Note that a separation distance should be maintained between the read pointer and the write pointer in order to avoid corrupting the data stream. Accordingly, there may be a maximum allowed negative read pointer offset in order to ensure this separation distance.

Figure 4:
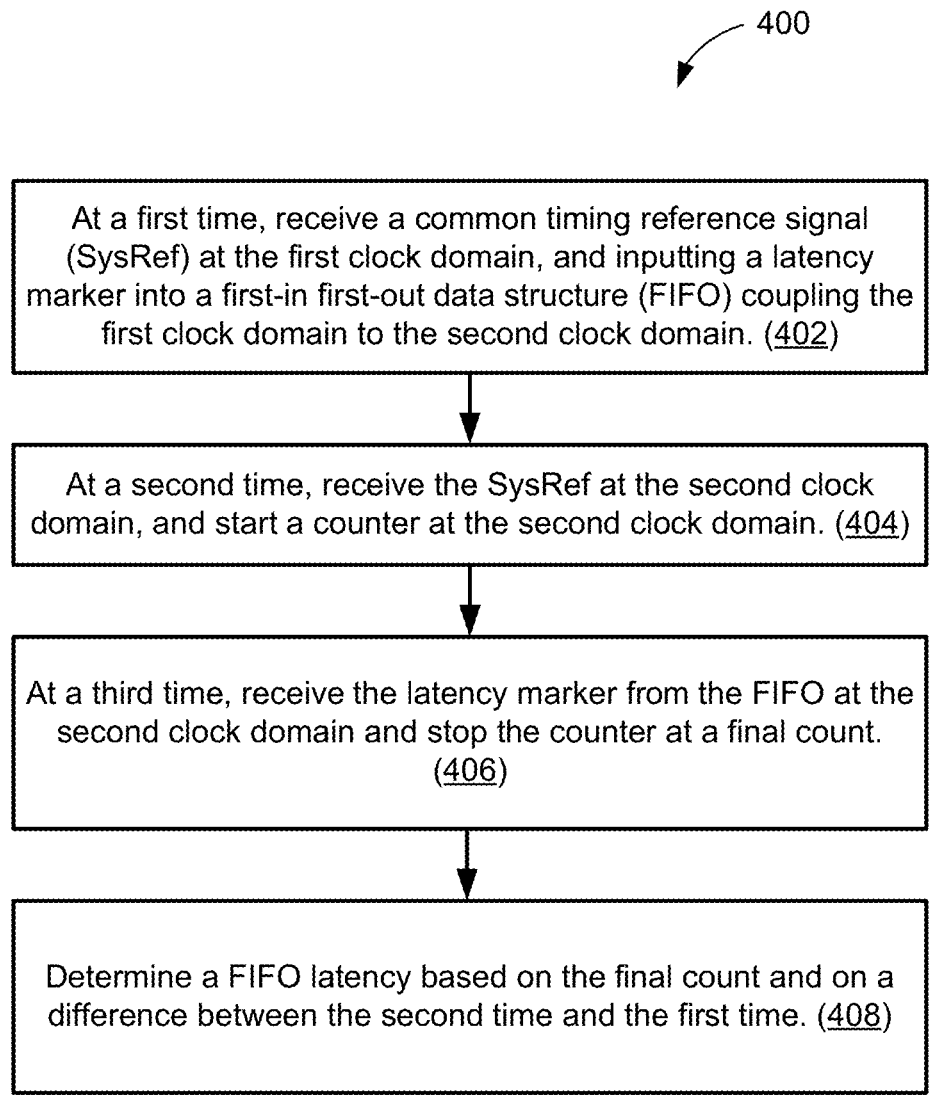
FIG. 4 is an illustrative flow chart depicting an example operation for tracking delay in signals sent from a first clock domain to a second clock domain, in accordance with some implementations.

FIG. 4 is an illustrative flow chart of an example operation 400 for tracking signals sent from a first clock domain to a second clock domain, in accordance with some implementations. Operation 400 may be performed by any suitable device, such as a TX 110 or RX 120 of FIG. 1, by a system 200 of FIG. 2, or using another suitable device the first clock domain may include a device transmitting data to one or more data converters included on the second clock domain. With respect to FIG. 4, at a first time, a common timing reference signal (SysRef) may be received at the first clock domain, and a latency marker may be input into a FIFO coupling the first clock domain to the second clock domain (402). At a second time, the SysRef may be received at the second clock domain, and a counter may be started at the second clock domain (404). At a third time, the latency marker may be received from the FIFO at the second clock domain and the counter may be stopped at a final count (406). The FIFO latency may then be determined based on the final count and on a difference between the second time and the first time (408).

As discussed above, applications such as MIMO, beamforming, phased-array radar, and so on, may require the use of multiple data converters, and that data streamed to these data converters is aligned. For example, such data converters may use the JESD204B standard, and may use a SysRef signal for synchronizing their respective independent clock domains. In order for SysRef to be used at these data converters, the signal must be synchronously received at each data converter. One problem which may arise is that a local clock of a data converter may have an edge, such as a rising edge, which coincides with the reception of the SysRef signal. For example, when the clock edge coincides with the reception of the SysRef signal, metastability may prevent the data converter from synchronously capturing SysRef. Because the data converters are in independent clock domains, the timing of these clock edges may vary among the data converters. Accordingly, each data converter may set a delay, for example using a programmable delay line (PDL), to delay the reception of SysRef to ensure it is synchronously captured. However, because SysRef is used for synchronization among the data converters, it is desirable that the delay settings for each data converter be similar, so that disparity in the timing of SysRef reception is minimized, while ensuring synchronous SysRef capture. Accordingly, some example implementations allow for the selection of appropriate delay settings for each of a plurality of data converters.

Figure 5:
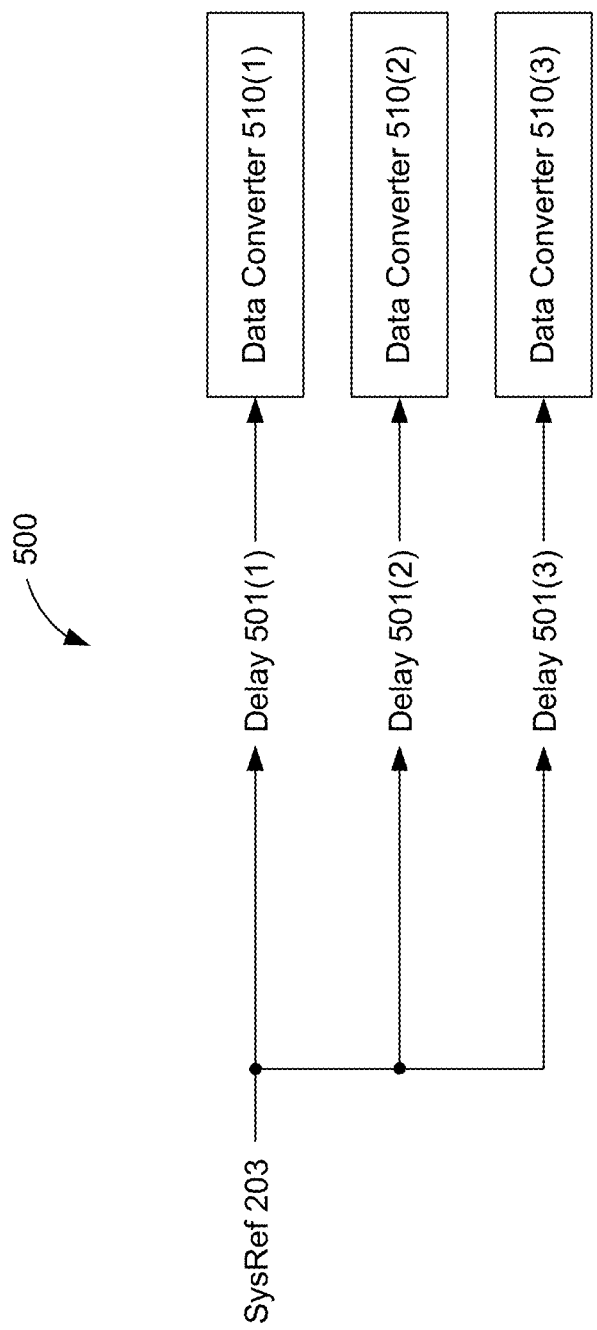
FIG. 5 is a block diagram showing reception of SysRef at each of a plurality of data converters, in which some aspects of the present disclosure may be implemented.

FIG. 5 is a block diagram 500 showing reception of SysRef at each of a plurality of data converters. Note that while FIG. 5 shows three data converters, the example implementations may be used with any number of data converters. With respect to FIG. 5, SysRef may be received at each of the data converters 510(1)-510(3) according to a respective delay 501(1)-501(3). As noted above, each of the data converters 510(1)-510(3) may be have independently determined clock signals, leading to differences among the data converters as to which delay settings allow for synchronous capture of SysRef.

Accordingly, example implementations allow for a controller to determine, for each data converter, a set of delay values, such as a set of PDL settings, for which SysRef may be synchronously captured. This controller may be located on one of the data converters or may alternately be external to the data converters. Thus, the delay settings may be stored, for example, in hardware, in a software program, or in an application or other software tool coupled to the data converters. A data converter may cycle through each delay value to determine the set of delay values for which SysRef is synchronously captured. If the delay values are provided by a PDL, the data converter may cycle through each PDL value and determine a set of PDL values for which SysRef is synchronously captured. In some examples, the PDL values may include 128 different values, or another suitable number of delay values.

Figure 6:
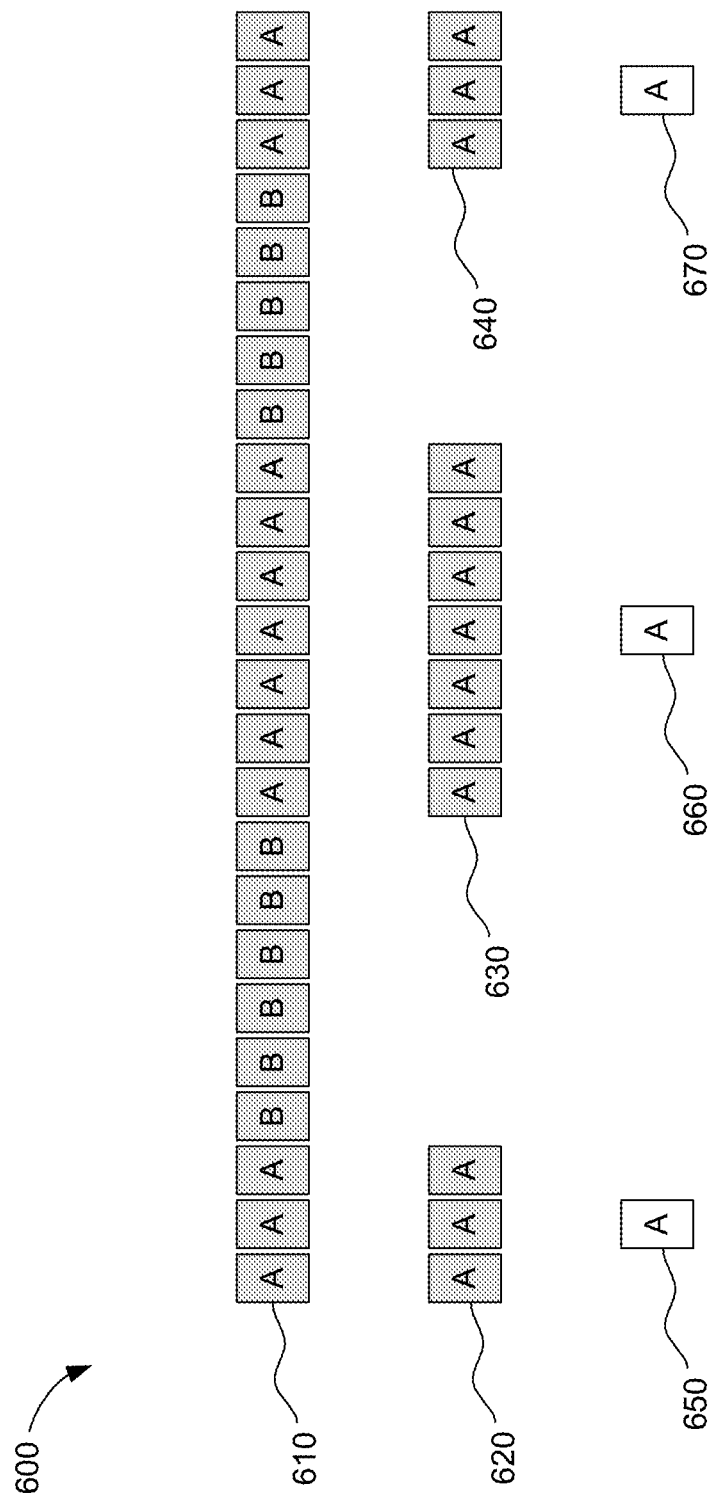
FIG. 6 is a PDL setting diagram showing selection of preferred PDL values, in accordance with some implementations.

FIG. 6 is a delay setting diagram 600 showing selection of preferred delay values, in accordance with some implementations. With respect to FIG. 6, a delay map 610 depicts a range of delay settings, and whether or not each delay setting in the range allows for SysRef to be synchronously captured. Each box in FIG. 6 represents a delay setting, and boxes noted 'A' correspond to delay settings where SysRef is synchronously captured, while boxes labelled 'B' correspond to delay settings where SysRef cannot be synchronously captured. Thus, delay map 610 includes three contiguous ranges of delay values where SysRef may be synchronously captured—ranges 620, 630, and 640. From these contiguous ranges of delay values, a set of preferred delay values may be selected. For example, a center delay value may be selected from each contiguous range of delay values, resulting in a set of preferred delay values. For example, a first preferred delay value 650 may be selected from delay range 620, while second and third preferred delay values 660 and 670 may be respectively selected from delay ranges 630 and 640. In FIG. 6 and in FIGS. 7A-7D, delay settings having a white background, such as delay setting 650, may correspond to the delay setting being a preferred delay setting.

Figure 7A:
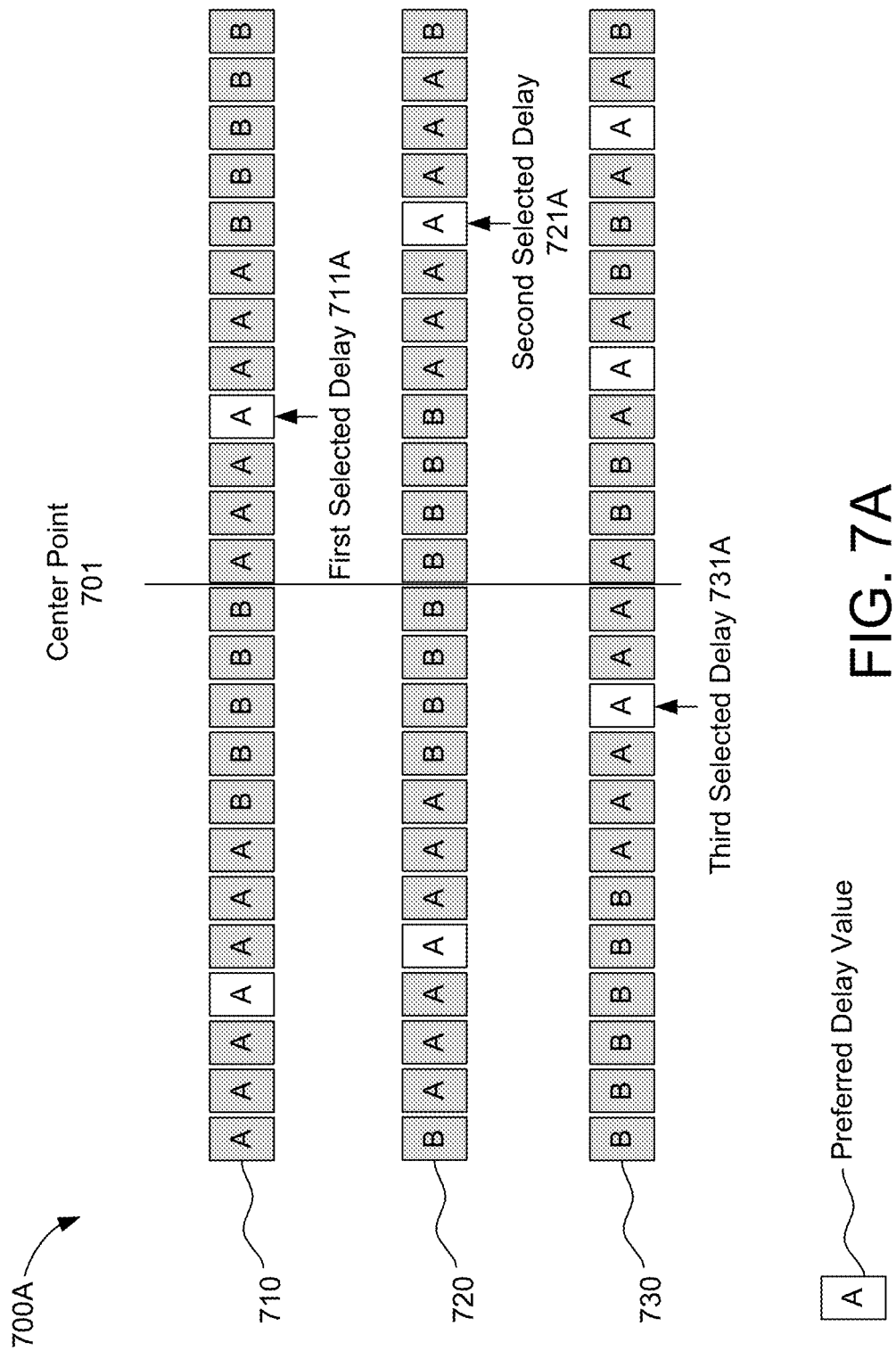
FIGS. 7A-7D show example techniques for selecting delay values for a plurality of data converters, according to some implementations.

After determining the set of delay settings for which SysRef is synchronously captured, and selecting the preferred set of delay values, a preferred delay value may be selected for each of the plurality of data converters—such as each of data converters 510(1)-510(3). For example, FIG. 7A shows an example technique 700A for selecting delay values for each of a plurality of data converters, according to some implementations. A delay map is shown for each of three data converters. Thus, delay maps 710, 720, and 730 are delay maps for respective first, second, and third data converters. With respect to technique 700A, the delay value closest to center point 701 may be selected as the delay for each data converter. Thus, a first selected delay 711A may be selected as the preferred delay value of delay map 710 which is nearest the center point 701. Similarly, second selected delay 721A and third selected delay 731A may be selected from delay maps 720 and 730. Note that while each selected delay is the preferred delay value nearest the center point 701 there may be significant variation among the selected delays for a plurality of data converters. For example, 9 delay values separate second selected delay 721A and third selected delay 731A. This may be undesirable. Such separation may impair the synchronization of the data converters by introducing disparities in the times at which the data converters receive SysRef.

Figure 7B:
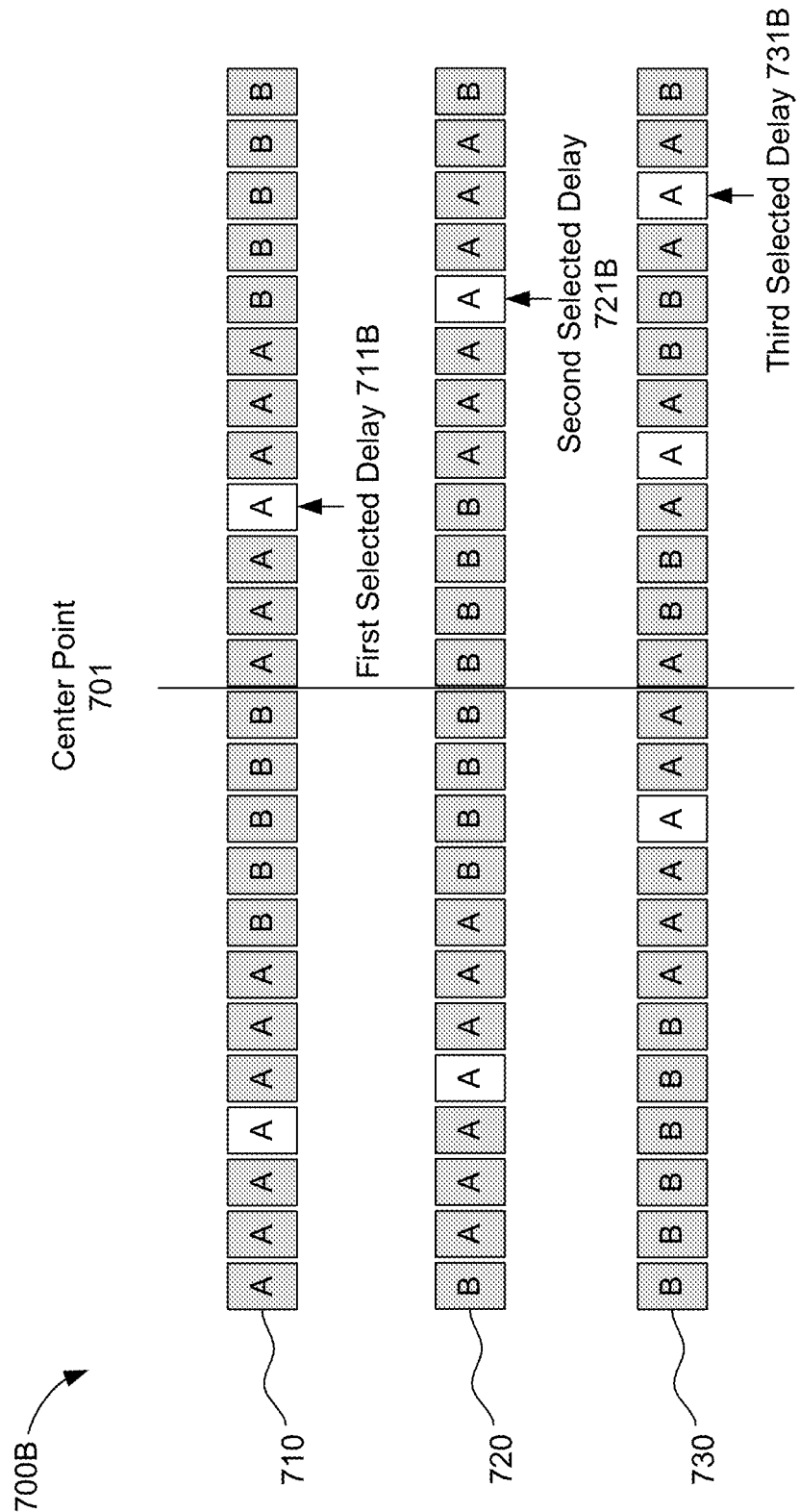

FIG. 7B shows another example technique 700B for selecting delay values for the plurality of data converters, according to some implementations. With respect to FIG. 7B, for the first data converter, a preferred delay value nearest center point 701 may be selected. Thus, first selected delay 711B may be selected from delay map 710 for the first data converter. Then, for each subsequent data converter the selected delay may be the preferred delay value nearest the previously selected delay. Thus, second selected delay 721B may be selected for the second data converter as it is the preferred delay value in PDL map 720 nearest the first selected delay 711B. Then, third selected delay 731B may be selected for the third data converter as it is the preferred delay value from delay map 730 nearest the second selected delay 721B. Note that technique 700B may result in less variation among the selected delay values as compared with technique 700A. However, while technique 700B may minimize differences between subsequently selected delays—such as between a second selected delay and a third selected delay—this technique does not account for the overall span of the selected delay values. For example, while the third selected delay 731B is the closest preferred delay value to the second selected delay 721B, there is another preferred delay value in PDL map 730 between the first selected delay 711B and the second selected delay 721B which would result in a lesser variation among the selected delays.

Figure 7C:
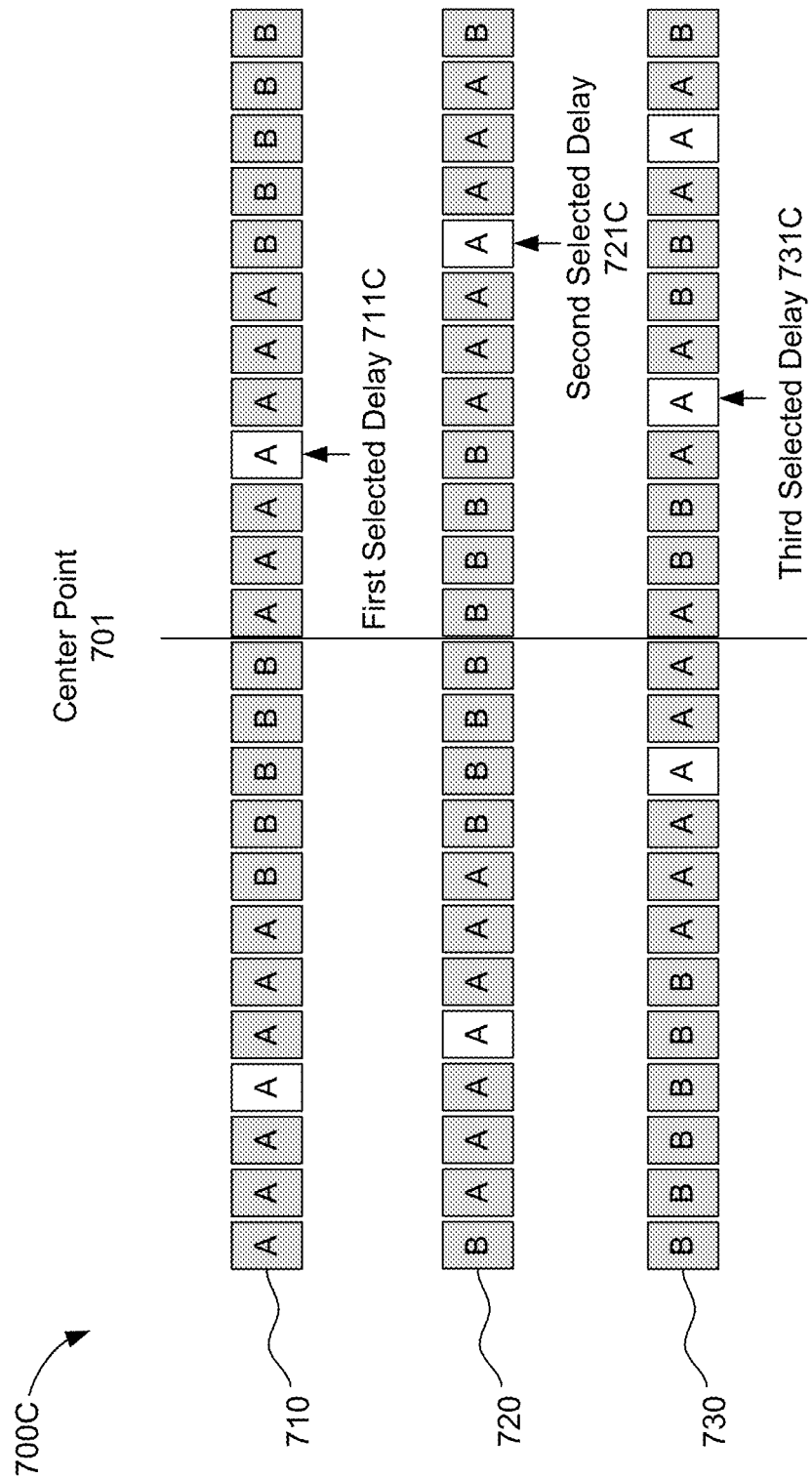

FIG. 7C shows another example technique 700C for selecting delay values for the plurality of data converters, according to some implementations. Technique 700C selects each subsequent delay to minimize the overall variation among the selected delays. More particularly, with respect to FIG. 7C, as with techniques 700A-700B, the selected delay for the first data converter may be the preferred delay nearest the center point 701—in other words, the first delay 711C is selected for the first data converter. For each subsequent data converter, the delay is selected to minimize the overall variation among the selected delays. This overall variation may be referred to as a delay span or delay range. Thus, the second selected delay 721C is the preferred delay value of delay map 720 nearest the first selected delay 711C, and the third selected delay 731C is the preferred delay value of delay map 730 which minimizes the delay range among the selected delays. More particularly, as between the two preferred delay values of delay map 730 to the right of center point 701, the rightmost results in a delay range of 6 among the three data converters, while the third selected delay 731C results in a delay range of only 4. Thus, technique 700C allows for the delay range to be minimized, resulting in better synchronization of SysRef reception among the data converters.

Figure 7D:
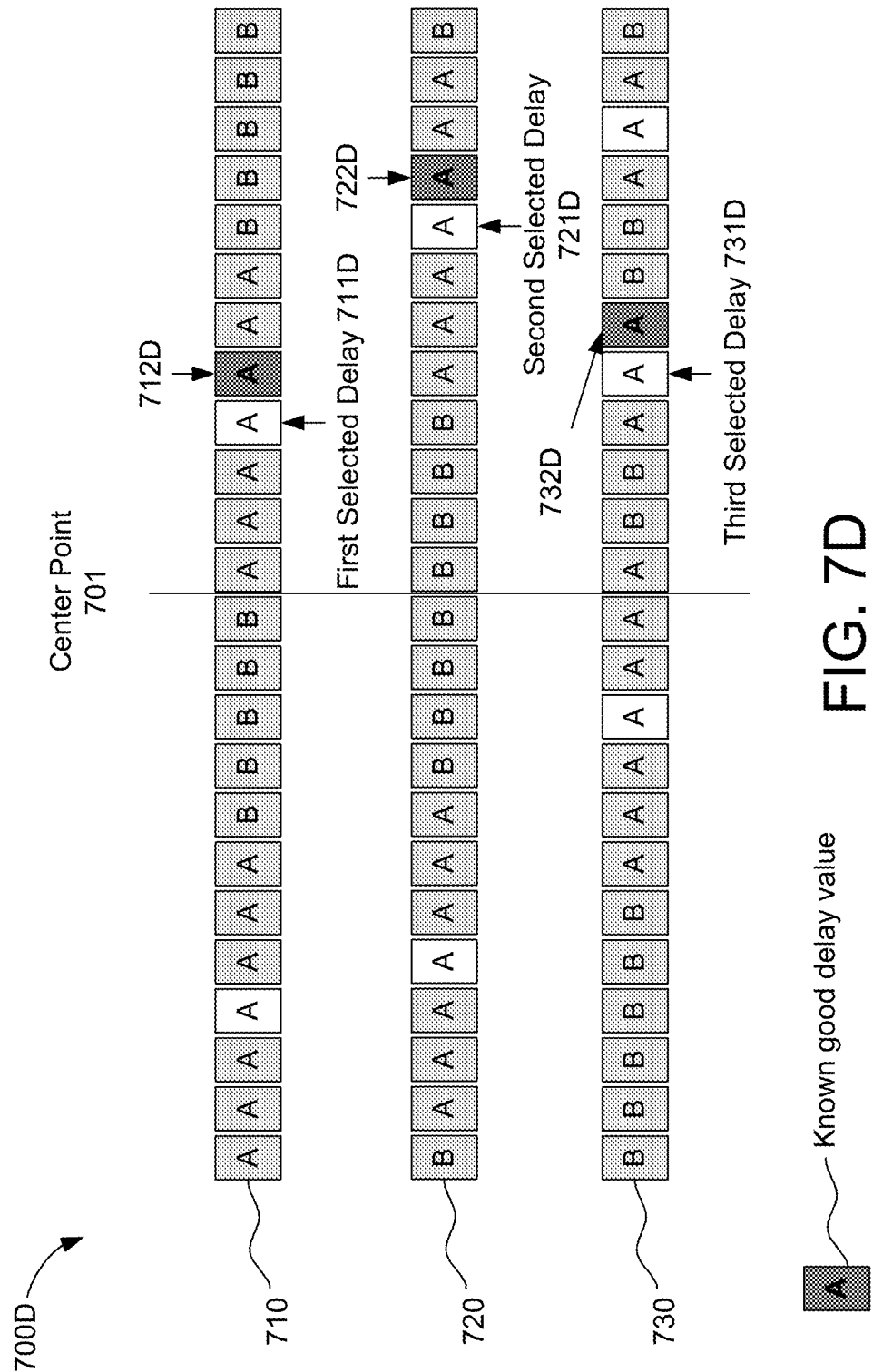

In some implementations, previously used delay values may be stored, and used for improving selection of subsequent delay values. For example, there may be a set of known good delay values, known to have previously resulted in good alignment among the data controllers. In example implementations where such a set of known good delay values are known, subsequently selected delay values may be chosen based at least in part on these known good delay values. For example, FIG. 7D shows a technique 700D for selecting delay values for the plurality of data converters based on a set of known good delay values, according to some implementations. With respect to FIG. 7D, each box with a dark gray background represents a known good delay value—thus, FIG. 7D shows a first known good delay value 712D, a second known good delay value 722D, and a third known good delay value 732D. As with techniques 700A-700C, the delay value for the first data converter may be selected as the preferred delay value nearest the center point 701. Thus, first selected delay 711D may be chosen for the first data converter. Note that the first selected delay 711D has a value 1 less than first known good delay value 712D. For the second data converter, the preferred delay value is selected such that the relative difference between the first and second selected delay values 711D and 721D matches, as closely as possible, the relative difference between the first and second known good delay values 712D and 722D. Thus, as the relative difference between the first and second known good delay values 712D and 722D is 4 delay settings, the delay is selected for the second data converter to match this relative difference. Thus, the second selected delay 721D is chosen, as the relative difference between the first selected delay 711D and second selected delay 721D matches this relative difference. Similarly, for the third data converter, the preferred delay value is selected such that the relative difference between the second and third selected delays 721D and 731D matches the relative difference between the second and third known good delay values 722D and 732D. Thus, as the relative difference between second and third known good delay values 722D and 732D is (−3), third delay value 731D is chosen to match this relative distance, as nearly as possible. The algorithm may proceed similarly for additional data converters for implementations including more than three.

In some implementations technique 700C may initially be used, when there are no known good delay values stored. For example, when a system is initially powered up, no known good delay values may be stored and technique 700C may be used for selecting delay values. After selecting the delay values, they may be stored by the controller for future use—as the set of known good delay values. When delay values are subsequently chosen, the known good delay values may be used, for example in technique 700D for selecting the delays.'

Figure 8:
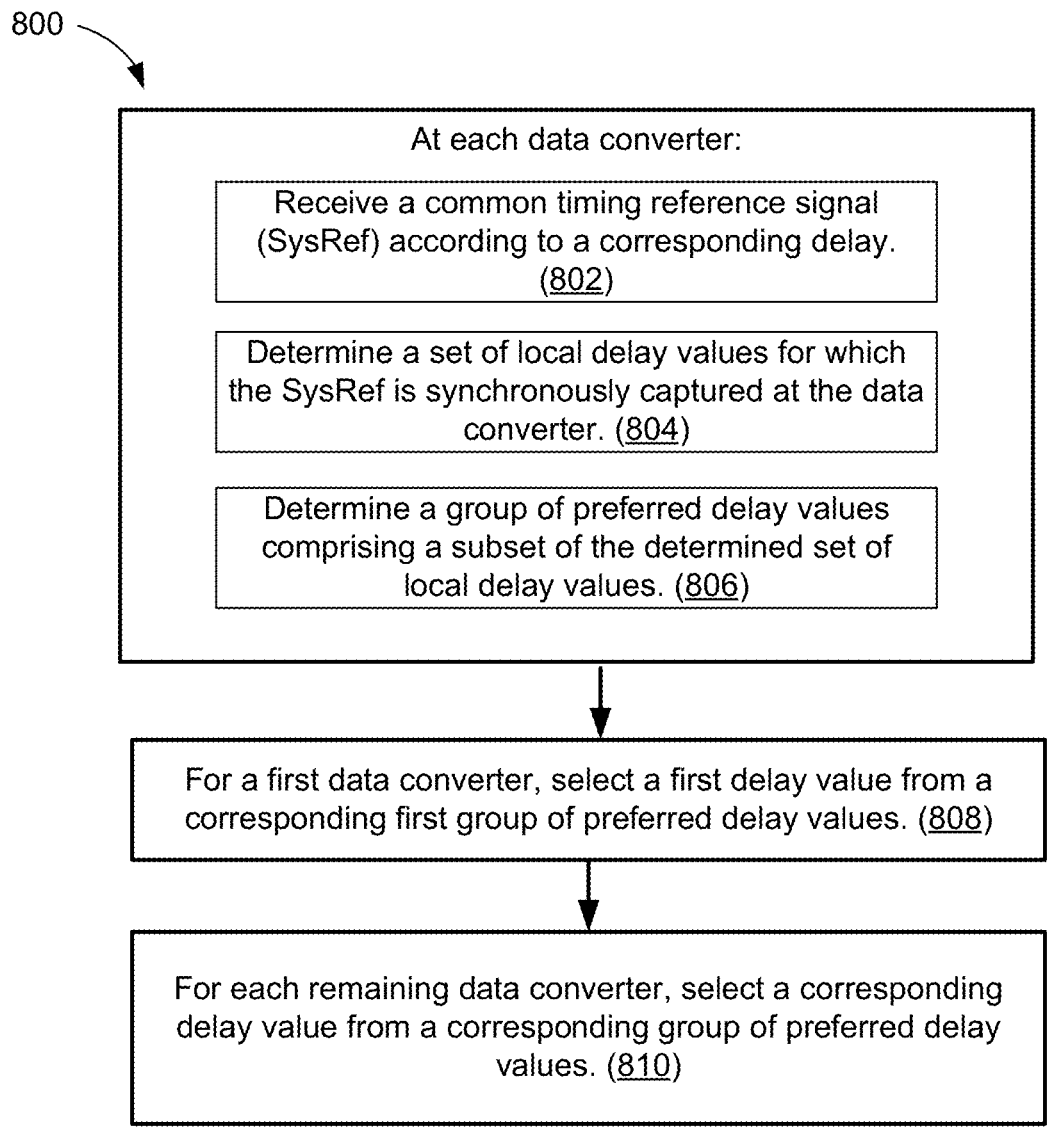
FIG. 8 is an illustrative flow chart depicting an example operation for aligning a plurality of independent data controllers, in accordance with some implementations.

FIG. 8 is an illustrative flow chart depicting an example operation 800 for aligning a plurality of independent data converters, in accordance with some implementations. The operation 800 may be performed by a controller of the plurality of data converters. With respect to FIG. 8, each data converter may: receive a common timing reference signal (SysRef) according to a respective delay (802); determine a set of local delay values for which the SysRef is synchronously captured at the data converter (804); and determine a group of preferred delay values comprising a subset of the determined set of local delay values (806). For a first data converter, a first delay value may be selected from a corresponding first group of preferred delay values (808). For each remaining data converter, a delay value may be selected from a corresponding group of preferred delay values (810).

As discussed above, applications which use multiple data converters, such as ADCs and DACs, may require precise synchronization of the data stream and synchronous control of the data path logic to ensure the data stream processing is deterministic. Because the data converters may be on independent clock domains, a common timing reference signal such as SysRef may be used for ensuring data transfers between the clock domains has deterministic latency. However, when the data converters generate a clock locally based on a low-frequency reference clock, for example using phase locked loops or other clock multipliers, nondeterministic phase may result.

For example, consider two data converters, each of which independently generates a clock using a PLL. Each data converter may receive a 200 MHz reference clock signal, and a SysRef. Each PLL may multiply the 200 MHz reference clock up to 12 GHz, and then divide by two to result in a 6 GHz signal. Even if both data converters and the reference signals are matched, the divider in each PLL could power up out of phase, and result in sampling clocks for the two data converters which are 180 degrees out of phase. Accordingly, it would be desirable to ensure deterministic phase of locally generated clocks in data converters. Many data converters which include local clock generation do not address this uncertainty, and while some other data converters recognize the need for clock generation with deterministic phase, they may often have limitations. For example, some devices may only provide deterministic phase for frequency dividers having specified divider ratios, multiplier ratios, or input/output frequency ratios.

Accordingly, example implementations may allow a clock generation circuit to provide deterministic phase without these limitations, by using SysRef to determine one or more synchronous divider reset signals, as discussed further below.

Figure 9:
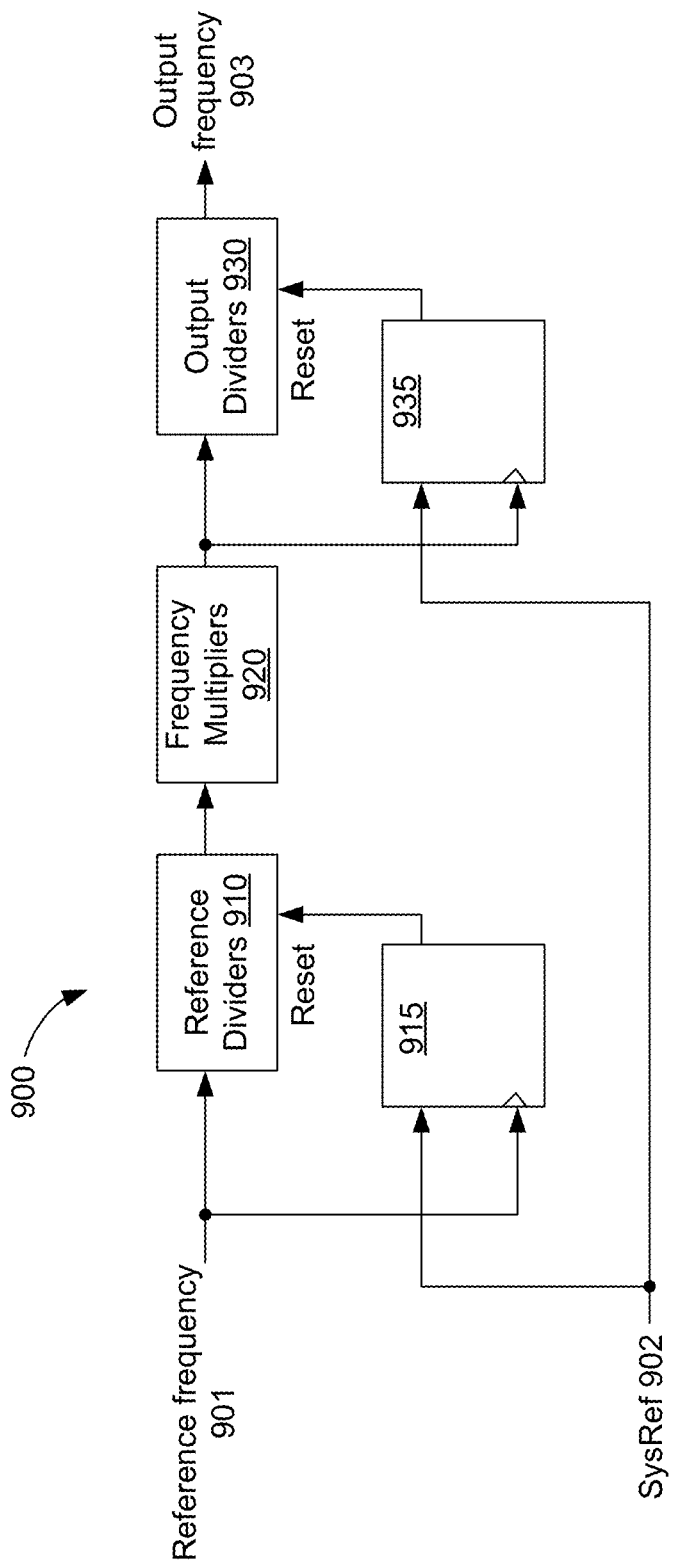
FIG. 9 shows an example clock generation circuit, in accordance with some implementations.

FIG. 9 shows an example clock generation circuit 900, according to some implementations. With respect to FIG. 9, a reference frequency signal 901 and a common timing reference signal (SysRef) 902 may be inputs to the clock generation circuit 900, which may further include reference dividers 910, a reference sampler 915, frequency multipliers 920, output dividers 930, and output sampler 935. More particularly, the reference frequency signal 901 may be provided to reference dividers 910, and the divided reference signal may be provided to frequency multipliers 920, which may include one or more PLLs or clock multipliers. The multiplied signal may be provided to output dividers 930, which may output an output frequency signal 903. To ensure a predictable phase in the output frequency signal 903, clock generation circuit 900 may use SysRef 902 to generate a synchronous reset pulse for each of the reference dividers 910 and the output dividers 930. More particularly, clock generation circuit 900 may use reference sampler 915 and output sampler 935 for determining the synchronous reset pulses. Reference sampler 915 may sample the SysRef 902 using the reference frequency signal 901 to generate a first synchronous reset pulse for resetting the reference dividers 910. The phase of the divided reference signal may then be locked to the SysRef 902. Consequently, the output of the frequency multipliers 920 may then have a predictable phase. The output sampler 935 may then sample the SysRef 902 using the output of the frequency multipliers 920 to generate a second synchronous reset pulse for resetting the output dividers 930. Consequently, the phase of the output frequency signal 903 may also be locked to the SysRef 902. In other words, synchronously resetting the reference dividers 910 and the output dividers 930 as shown in clock generation circuit 900 ensures that the phase of the output frequency 903 is predictable, and locked to the SysRef 902. Note that while reference sampler 915 and output sampler 935 are shown in FIG. 9 as flip-flops, in other implementations these devices may include other devices for sampling SysRef 902.

Note that the implementation shown in clock generation circuit 900 is not limited for use with specified divider ratios, multiplier ratios, or input/output frequency ratios, as some conventional data converter clock generation circuits. Further, while FIG. 9 shows a particular arrangement of frequency multipliers and dividers, other implementations may be used with any arrangement of frequency multipliers and dividers incorporating the example synchronous divider reset.

Figure 10:
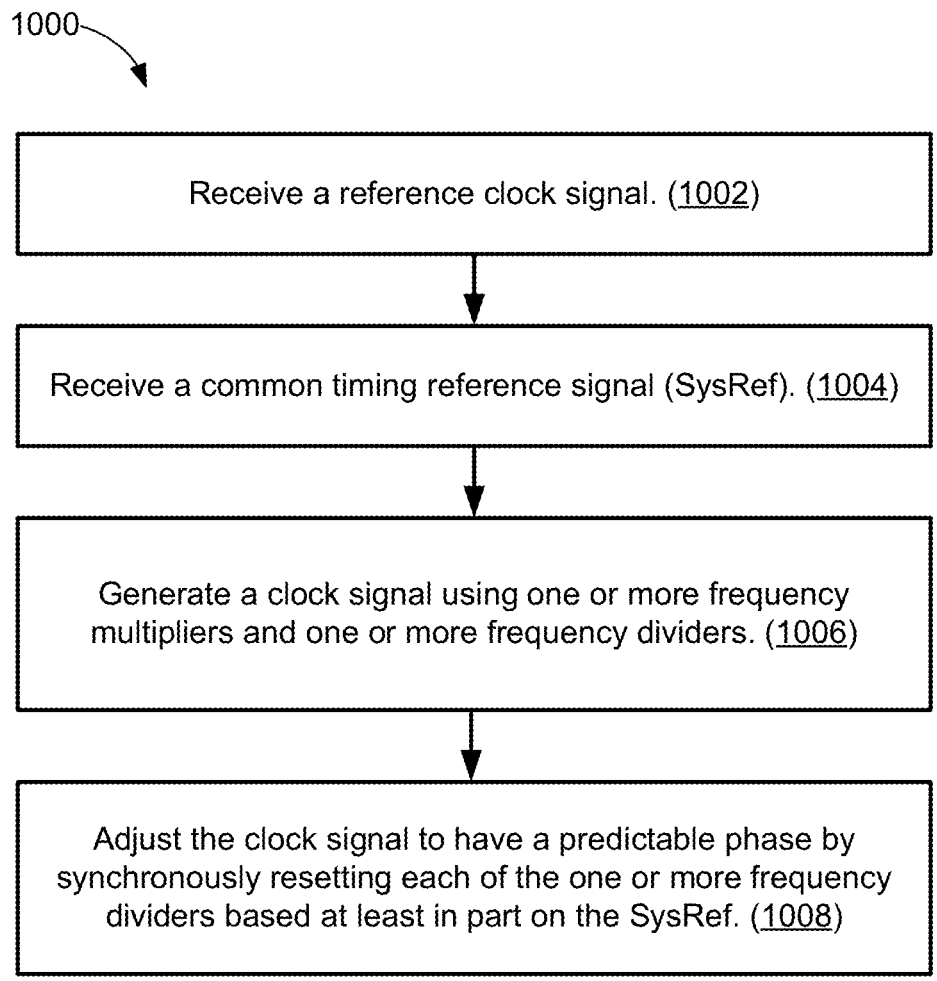
FIG. 10 is an illustrative flow chart depicting an example operation for generating a clock signal having a predictable phase, in accordance with some implementations.

FIG. 10 is an illustrative flowchart depicting an example operation 1000 for generating a clock signal. The operation 1000 may be performed by any suitable data converter, for example a data converter incorporating a clock generation circuit 900 as shown in FIG. 9. With respect to FIG. 10, a reference clock signal may be received (1002). A common timing reference signal (SysRef) may also be received (1004). A clock signal may be generated using one or more frequency dividers and one or more frequency multipliers (1006). The clock signal may be adjusted to have a predictable phase by synchronously resetting each of the one or more frequency dividers based at least in part on the SysRef (1008).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for tracking delay in signals, the method comprising:
   at a first time, receiving a common timing reference signal (SysRef) at a transmitter on a first clock domain, and inputting, in response to the SysRef and a clock signal of the transmitter, a latency marker into a first-in first-out data structure (FIFO) coupling the first clock domain to a second clock domain;
   at a second time, receiving the SysRef at a receiver on a second clock domain, and starting a counter at the second clock domain in response to the SysRef and a clock signal of the receiver, wherein the first clock domain differs from the second clock domain;
   at a third time, receiving the latency marker from the FIFO at the second clock domain and stopping the counter at a final count; and
   determining a FIFO latency based on the final count and on a difference between the second time and the first time.

2. The method of claim 1, further comprising, synchronizing one or more events on the first clock domain and the second clock domain based at least in part on the latency marker.

3. The method of claim 2, wherein a data converter is on the second clock domain, and synchronizing the one or more events comprises, at the third time, passing the latency marker with a data flow to the data converter.

4. The method of claim 1, further comprising selectively adjusting a read pointer of the FIFO based at least in part on the FIFO latency.

5. The method of claim 4, wherein the read pointer of the FIFO is selectively adjusted based at least in part on a comparison of the FIFO latency to a clock domain latency associated with a third clock domain coupled to the first clock domain.

6. The method of claim 5, wherein selectively adjusting the read pointer comprises positively offsetting the read pointer in response to determining that the FIFO latency is less than the clock domain latency.

7. The method of claim 5, wherein selectively adjusting the read pointer comprises negatively offsetting the read pointer in response to determining that the FIFO latency is greater than the clock domain latency.

8. The method of claim 1, further comprising:
   writing a first number of words to the FIFO for each cycle of a write clock associated with the first clock domain, and reading a second number of words from the FIFO for each cycle of a read clock associated with the second clock domain;
   wherein the latency marker input into the FIFO is input at a predetermined word within a cycle of the write clock; and
   wherein determining the FIFO latency is further based on the second number of words and a position of the predetermined word.

9. A latency determination circuit, comprising:
   a transmitter on a first clock domain;
   a receiver on a second clock domain, the receiver comprising a counter; and
   a first-in first-out data structure (FIFO) coupling the first clock domain to the second clock domain, wherein the first clock domain differs from the second clock domain;
   wherein the transmitter is configured to, at a first time, receive a common timing reference signal (SysRef) and input, in response to the SysRef and a clock signal of the transmitter, a latency marker into the FIFO; and
   wherein the receiver is configured to:
      at a second time, receive the SysRef, and start the counter in response to the SysRef and a clock signal of the receiver;
      at a third time, receive the latency marker from the FIFO and stop the counter at a final count; and
      determine a FIFO latency based on the final count and on a difference between the second time and the first time.

10. The latency determination circuit of claim 9, wherein the receiver is further configured to synchronize one or more events on the first clock domain and the second clock domain based at least in part on the latency marker.

11. The latency determination circuit of claim 10, wherein the receiver comprises a data converter, and wherein synchronizing the one or more events comprises, at the third time, passing the latency marker with a data flow to the data converter.

12. The latency determination circuit of claim 9, wherein the receiver is further configured to selectively adjust a read pointer of the FIFO based at least in part on the FIFO latency.

13. The latency determination circuit of claim 12, wherein the read pointer of the FIFO is selectively adjusted based at least in part on a comparison of the FIFO latency to a clock domain latency associated with a third clock domain coupled to the first clock domain.

14. The latency determination circuit of claim 13, wherein the read pointer is selectively adjusted by positively offsetting the read pointer in response to determining that the FIFO latency is less than the clock domain latency.

15. The latency determination circuit of claim 13, wherein the read pointer is selectively adjusted by negatively offsetting the read pointer in response to determining that the FIFO latency is greater than the clock domain latency.

16. The latency determination circuit of claim 9, wherein:
   the transmitter is further configured to write a first number of words to the FIFO for each cycle of a write clock associated with the first clock domain, and the latency marker is input into the FIFO at a predetermined word within a cycle of the write clock;
   the receiver is further configured to read a second number of words from the FIFO for each cycle of a read clock associated with the second clock domain, and to determine the FIFO latency based at least in part on the second number of words and a position of the predetermined word.

17. A latency determination circuit, comprising:
one or more processors; and
a memory storing instructions that, when executed by the one or more processors, cause the latency determination circuit to perform operations comprising:
- at a first time, receiving a common timing reference signal (SysRef) at a first clock domain, and inputting, in response to the SysRef and a clock signal of a transmitter on the first clock domain, a latency marker into a first-in first-out data structure (FIFO) coupling the first clock domain to a second clock domain;
- at a second time, receiving the SysRef at the second clock domain, and starting, in response to the SysRef and a clock signal of a receiver on the second clock domain, a counter at the second clock domain, wherein the second clock domain differs from the first clock domain;
- at a third time, receiving the latency marker from the FIFO at the second clock domain and stopping the counter at a final count; and
- determining a FIFO latency based on the final count and on a difference between the second time and the first time.

18. The latency determination circuit of claim 17, wherein execution of the instructions causes the latency determination circuit to perform operations further comprising synchronizing one or more events on the first clock domain and the second clock domain based at least in part on the latency marker.

19. The latency determination circuit of claim 18, wherein the instructions which execute to synchronize the one or more events causes the latency determination circuit to perform operations further comprising, at the third time, passing the latency marker with a data flow to a data converter on the second clock domain.

20. The latency determination circuit of claim 17, wherein execution of the instructions causes the latency determination circuit to perform operations further comprising selectively adjusting a read pointer of the FIFO based at least in part on a comparison clock domain latency associated with a third clock domain coupled to the first clock domain.

* * * * *